(12) United States Patent
Amini

(10) Patent No.: US 11,334,811 B2
(45) Date of Patent: May 17, 2022

(54) EFFICIENT COOLING OF ION CHAINS FOR QUANTUM COMPUTATION

(71) Applicant: IonQ, Inc., College Park, MD (US)

(72) Inventor: Jason Madjdi Amini, Takoma Park, MD (US)

(73) Assignee: IONQ, INC., College Park, MD (US)

( * ) Notice: Subject to any disclaimer, the term of this patent is extended or adjusted under 35 U.S.C. 154(b) by 412 days.

(21) Appl. No.: 16/450,779

(22) Filed: Jun. 24, 2019

(65) Prior Publication Data

US 2020/0005178 A1 Jan. 2, 2020

Related U.S. Application Data

(60) Provisional application No. 62/692,099, filed on Jun. 29, 2018.

(51) Int. Cl.
*G06N 10/00* (2022.01)

(52) U.S. Cl.
CPC .................... *G06N 10/00* (2019.01)

(58) Field of Classification Search
CPC ..................................... G06N 10/00
USPC ................................. 359/107, 108
See application file for complete search history.

(56) References Cited

U.S. PATENT DOCUMENTS

| | | | | |
|---|---|---|---|---|
| 9,858,531 B1 * | 1/2018 | Monroe | ................. | G06N 10/00 |
| 10,637,449 B1 * | 4/2020 | Cohen | ..................... | G06F 15/82 |
| 2019/0138928 A1 * | 5/2019 | Monroe | ................. | G06F 9/5027 |

OTHER PUBLICATIONS

Regina Lechner. Multi-mode cooling techniques for trapped ions. Leopold-Franzens-Universität Innsbruck, Aug. 2016. (Year: 2016).*
International Search Report and Written Opinion corresponding to International Application No. PCT/US2019/039017, dated Aug. 29, 2019.
Rohde, H., et al., "Sympathetic ground state cooling and coherent manipulation with two-ion-crystals", ARXIV.org, Cornell University, Sep. 8, 2000, pp. 1-15.
Lin, Y., et al., "Sympathetic EIT laser cooling of motional modes in an ion chain", National Institute of Standards and Technology, [URL: https://arxiv.org/pdf/1211.6647.pdf], Nov. 28, 2012, pp. 1-5.
Tano, Wayne M., et al., "Cooling methods in ion traps", Physica Scripta, vol. T59, Jan. 1, 1995, (16 pages).
Eschner, J. et al., "Laser cooling of trapped ions", Journal of Optical Society of America, vol. 20, No. 5, May 2003, pp. 1003-1015.

\* cited by examiner

*Primary Examiner* — Collin X Beatty
(74) *Attorney, Agent, or Firm* — ArentFox Schiff LLP

(57) ABSTRACT

The disclosure describes various aspects of techniques for cooling a chain of ions to near the combined ground state that does not grow with the number of ions in the chain. By addressing each ion individually and using each ion to cool a different motional mode, it is possible to cool the motional modes concurrently. In an example, a third of the total motional modes can be cooled at the same time. In an aspect, the techniques include generating a sideband cooling laser beam for each ion in the ion chain, concurrently cooling two or more motional modes associated with the ions in the ion chain using the respective sideband cooling laser beam until each of the two or more motional modes reaches a motional ground state, and performing a quantum computation using the ion chain after the two or more motional modes have reached the motional ground state.

16 Claims, 12 Drawing Sheets

EFFICIENT COOLING OF ION CHAINS FOR QUANTUM COMPUTATION

CROSS REFERENCE TO RELATED APPLICATION

The present application claims priority to and the benefit from U.S. Provisional Patent Application No. 62/692,099, entitled "EFFICIENT COOLING OF ION CHAINS FOR QUANTUM COMPUTATION," and filed on Jun. 29, 2018, the contents of which are incorporated herein by reference in their entirety.

BACKGROUND OF THE DISCLOSURE

Aspects of the present disclosure generally relate to quantum systems, and more specifically, to efficient cooling of ion chains used for atomic quantum bits (qubits) in quantum computations.

Trapped atoms are one of the leading implementations for quantum information processing. Atomic-based qubits can be used as quantum memories, as quantum gates in quantum computers and simulators, and can act as nodes for quantum communication networks.

Performing entangling gates between physical qubits in an ion chain is needed to enable large-scale quantum computation. To this end, quantum computations with trapped atomic ions (qubits) use the ions' combined motion to create the entangling gates. Since the initial motional state affects the gate operation, the ions are typically first cooled to near the motional ground state at the beginning of or during (if using sympathetic cooling) the quantum computation. The number of motional modes that need to be cooled is proportional to the number of ions. Traditionally, the motional modes are cooled sequentially, that is, a next motional mode is cooled only after the previous motional mode has been cooled. As the number of atomic ions increases, this causes the total cooling time to lengthen.

As the cooling process becomes longer, heating of the motional modes from electric field fluctuations in the ion trap electrodes can cause noise that can then overwhelm the cooling process. It thus becomes advantageous to implement faster cooling methods. Accordingly, techniques that allow for more efficient cooling of ion chains are desirable.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

The disclosure describes techniques to cool a chain of ions to near the combined motional ground state that does not grow in execution time with the number of ions. By addressing each ion individually and using each ion to cool a different motional mode, it is possible to simultaneously cool multiple motional modes. In an example, it is possible to simultaneously cool one third of the total motional modes. In other examples, a different number of the total motional modes may be cooled.

In an aspect of the disclosure, a method for cooling of an ion chain having multiple ions is described that includes generating a sideband cooling laser beam for each ion in the ion chain; concurrently cooling two or more motional modes associated with the ions in the ion chain using the respective sideband cooling laser beam until each of the two or more motional modes reaches a motional ground state; and performing a quantum computation using the ion chain after the two or more motional modes have reached the motional ground state.

In another aspect of the disclosure, a quantum information processing (QIP) system for cooling of an ion chain having multiple ions is described that includes one or more optical sources configured to generate a sideband cooling laser beam for each ion in the ion chain; a beam controller configured to concurrently cool two or more motional modes associated with the ions in the ion chain using the respective sideband cooling laser beam until each of the two or more motional modes reaches a motional ground state; and an algorithms component configured to perform a quantum computation using the ion chain after the two or more motional modes have reached the motional ground state.

In another aspect of the disclosure, a computer-readable storage medium storing code with instructions executable by a processor for cooling of an ion chain having multiple ions is described that includes code for generating a sideband cooling laser beam for each ion in the ion chain; code for concurrently cooling two or more motional modes associated with the ions in the ion chain using the respective sideband cooling laser beam until each of the two or more motional modes reaches a motional ground state; and code for performing a quantum computation using the ion chain after the two or more motional modes have reached the motional ground state.

BRIEF DESCRIPTION OF THE DRAWINGS

The appended drawings illustrate only some implementation and are therefore not to be considered limiting of scope.

DETAILED DESCRIPTION

Figure 1A:
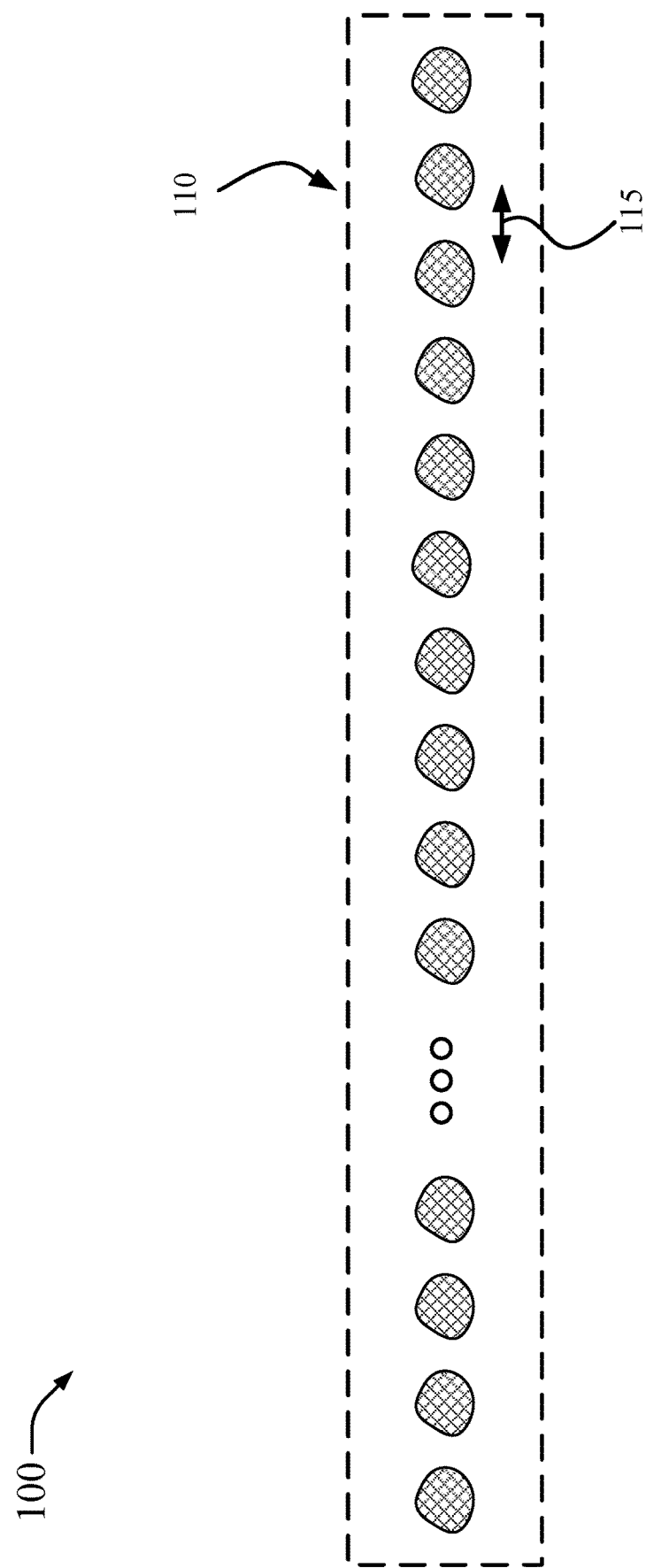
FIG. 1A illustrates a diagram representing of a trap holding atomic ions that form a linear crystal or lattice in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As described above, trapped atoms may be used to implement quantum information processing. Atomic-based qubits can be used as different types of devices, including but not limited to quantum memories, quantum gates in quantum computers and simulators, and nodes for quantum communication networks. Qubits based on trapped atomic ions can have very good coherence properties, can be prepared and measured with nearly 100% efficiency, and can be readily entangled with each other by modulating their Coulomb interaction with suitable external control fields such as optical or microwave fields. As used in this disclosure, the terms "atomic ions," "atoms," and "ions" may be used interchangeably to describe the particles that are to be confined, or are actually confined, in a trap to form a chain, a crystal, a lattice, or similar arrangement or configuration. This disclosure describes techniques in the form of methods or processes and equipment or apparatuses for cooling motional modes in a crystal of trapped atomic ions.

The typical ion trap geometry or structure used for quantum information and metrology purposes is the linear radio frequency (RF) Paul trap (also referred to as an RF trap or simply a Paul trap), where nearby electrodes hold static and dynamic electrical potentials that lead to an effective inhomogeneous harmonic confinement of the ions. The RF Paul trap is a type of trap that uses electric fields to trap or confine charged particles in a particular region, position, or location. When atomic ions are laser-cooled to very low temperatures in such a trap, the atomic ions form a stationary crystal of qubits (e.g., a structured arrangement of qubits), with Coulomb repulsion balancing the external confinement force. For sufficient trap anisotropy, the ions can form a linear crystal along the weak direction of confinement, and this is the arrangement typically employed for applications in quantum information and metrology.

The disclosure describes techniques to cool a chain of ions (e.g., a lattice or crystal of ions) to near the combined motional ground state that does not grow in execution time with the number of ions. By addressing each ion individually and using each ion to cool a different motional mode, it is possible to simultaneously cool the motional modes. In an example, it is possible to simultaneously cool one third of the total motional modes.

FIG. 1A illustrates a diagram representing the trapping of atomic ions in a linear crystal 110 using, for example, a linear RF Paul trap (by using electrodes inside a vacuum chamber) in a vacuum chamber 100. In the example shown in FIG. 1A, a vacuum chamber in a quantum system can include a set of electrodes for trapping N (N≥1) atomic Ytterbium ions (e.g., $^{171}Yb^+$ ions) which are confined in the linear crystal 110 and can be laser-cooled to be nearly at rest. The number of atomic ions trapped can be configurable. The atoms are illuminated with laser radiation tuned to a resonance in $^{171}Yb^+$ and the fluorescence of the atomic ions is imaged onto a camera. In an example, atomic ions can be separated by a distance 115 of about 5 microns (μm) from each other, which can be verified by fluorescence. The separation of the atomic ions is determined by a balance between the external confinement force and Coulomb repulsion.

Figure 1B:
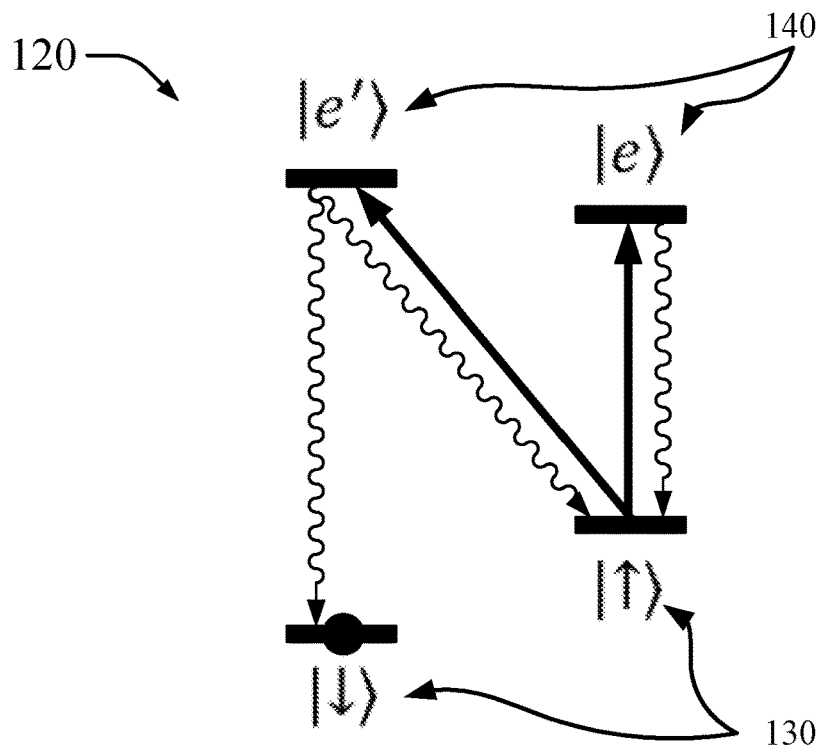
FIG. 1B is a diagram illustrating an example of a reduced energy level diagram showing the application of laser radiation for state initialization in accordance with aspects of the disclosure.
Figure 1C:
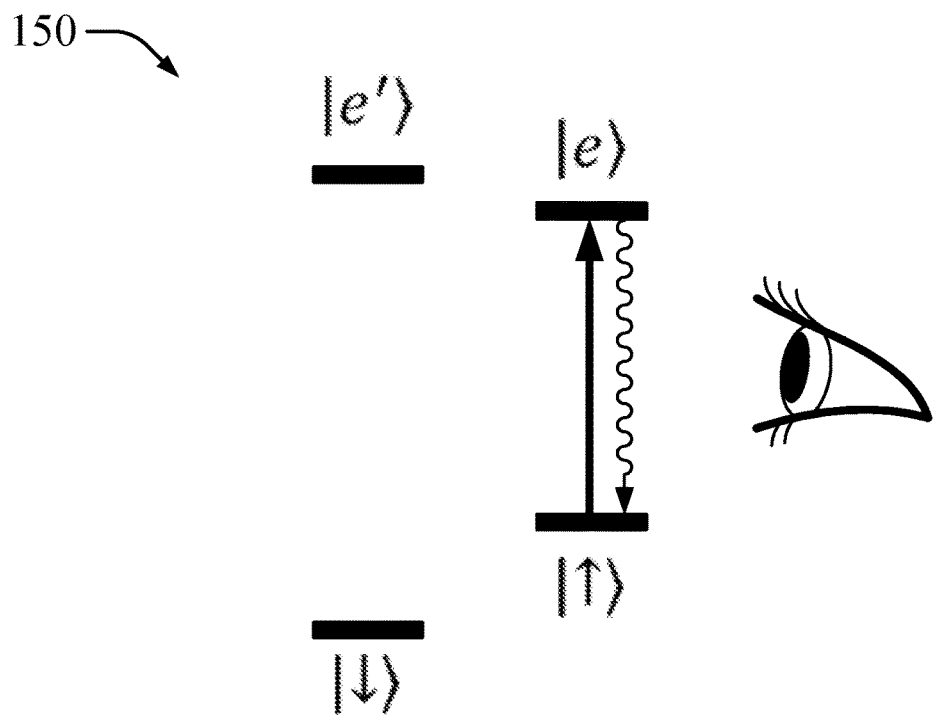
FIG. 1C is a diagram illustrating an example of a reduced energy level diagram showing the application of laser radiation for qubit state detection through fluorescence in accordance with aspects of the disclosure.

Strong fluorescence of individual trapped atomic ions relies on the efficient cycling of photons with the atomic ion species chosen for strong closed optical transition that allows for laser-cooling of the motion, qubit state initialization, and efficient qubit readout. Within these atomic ions, quantum bits can be represented by two stable electronic levels, often characterized by an effective spin with the two states $|\uparrow\rangle$ and $|\downarrow\rangle$, or equivalently $|1\rangle$ and $|0\rangle$. For example, FIG. 1B and FIG. 1C show the reduced energy level diagrams 120 and 150, respectively, for atomic ion $^{171}Yb^+$ where the qubit levels $|\uparrow\rangle$ and $||\downarrow\rangle$ 130 are represented by the stable hyperfine levels in the ground electronic state, and are separated by frequency $\omega_0/2\pi = 12.642812$ GHz. The excited electronic states $|e\rangle$ and $|e'\rangle$ 140 in $^{171}Yb^+$ are themselves split by a smaller hyperfine coupling and are separated from the ground states by an optical interval having an energy corresponding to an optical wavelength of 369.53 nm.

Laser radiation tuned just below resonance in these optical transitions allows for Doppler laser cooling to confine the atomic ions near the bottom of the trap. Other more sophisticated forms of laser cooling can bring the atomic ions to be nearly at rest in the trap, as will be discussed in this disclosure.

When a bichromatic laser beam (e.g., a beam with two tones produced by sidebands resulting from optical modulation) resonant with both $|\uparrow\rangle \leftrightarrow |e\rangle$ and $|\downarrow\rangle \leftrightarrow |e'\rangle$ transitions is applied to the atom, it rapidly falls into the state II) and no longer interacts with the light field, allowing the initialization of the qubit with essentially 100% fidelity (see e.g., FIG. 1B).

When a single laser beam resonant with the $|\uparrow\rangle \leftrightarrow |e\rangle$ transition is applied, a closed cycling optical transition causes an ion in the $|\uparrow\rangle$ state to fluoresce strongly while an ion in the $|\downarrow\rangle$ state stays dark because the laser frequency is far from its resonance (see e.g., FIG. 1C). The collection of even a small fraction of this fluorescence allows for the detection of the atomic qubit state with near-perfect efficiency or accuracy. Other atomic species may have similar initialization/detection schemes.

In FIGS. 1B and 1C, all allowed transitions from the excited electronic states $|e\rangle$ and $|e'\rangle$ 140 are illustrated as downward, wavy arrows. On the other hand, the applied laser radiation (which is shown as upward, straight arrows) drive these transitions for initialization to state $|\eta\rangle$ as shown in FIG. 1B, and for fluorescence detection of the qubit state ($|\uparrow\rangle$ =fluorescence, $|\downarrow\rangle$ =no fluorescence) as shown in FIG. 1C.

Figure 2:
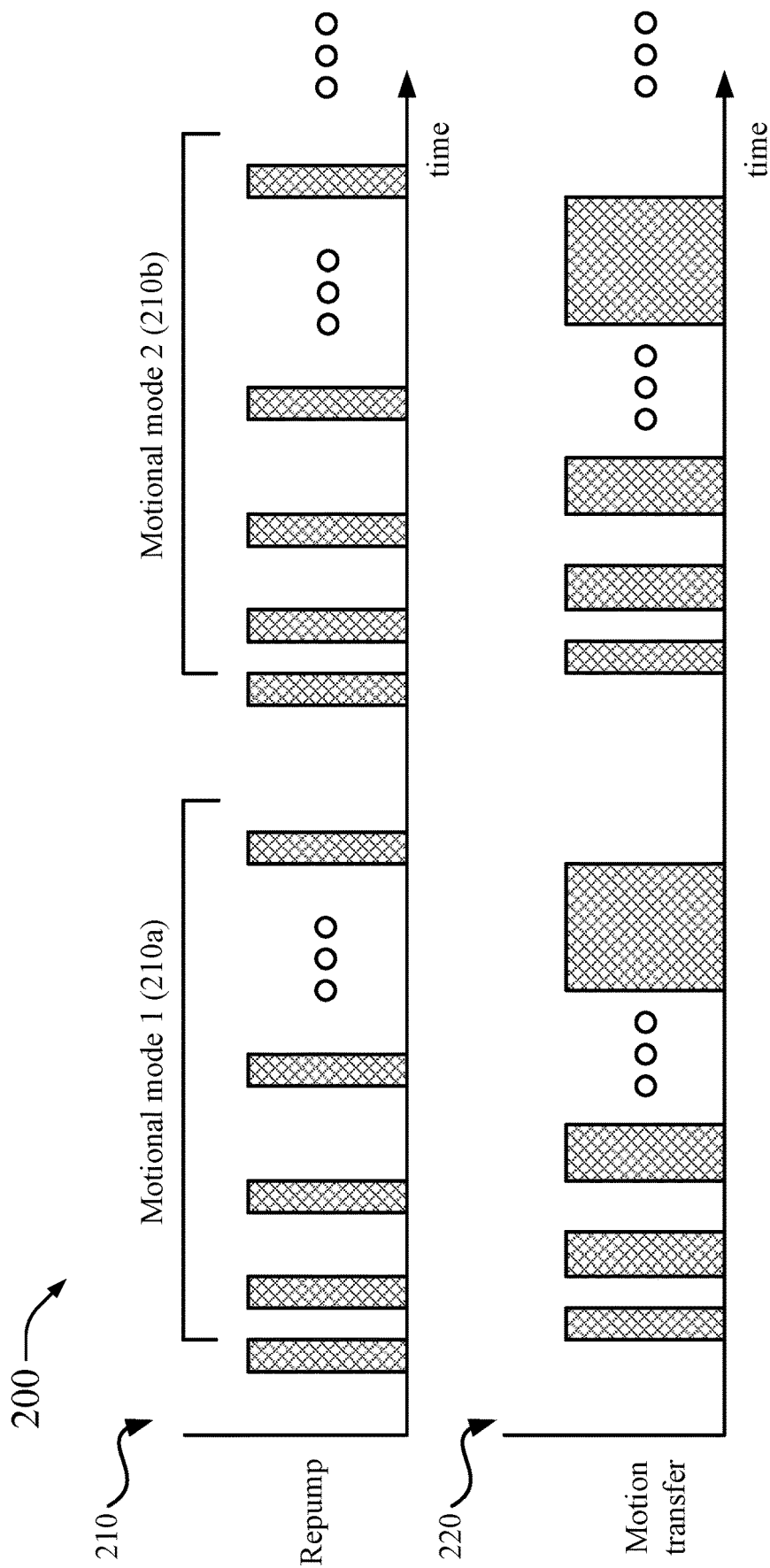
FIG. 2 is a diagram that illustrates an example of a sequential sideband cooling process.

In addition to Doppler laser cooling, a process of sideband cooling of ions is also used in which a laser beam or combination of laser beams are used to remove a single quantum or quanta of motion from the quantized, collective motion of a trapped collection of ions. FIG. 2 shows a diagram 200 that describes a sequential technique currently used for sideband cooling. Sideband cooling proceeds with the following steps as illustrated in the diagram 200 in FIG. 2: (1) The ions are reset into the lower energy state using a "repump" laser beam (see e.g., 210); (2) a motional dependent laser interaction transfers one quantum of motion into the state change from the lower internal energy state into the upper internal energy state (see e.g., 220); (3) the ions are reset again; and (4) repeat from (2) until most or all quanta of energy are removed.

The timing of step (2) is varied over the repetitions indicated in step (4) to maximize the rate of quanta removal. The timings may also vary for the particular motional state being cooled. Tens to hundreds of repetitions (or more) may be needed to remove sufficient motional quanta to allow high quality quantum operations on the atoms/ions. For a chain of ions, this process may usually be repeated for each of the collective modes of motion.

In the example in FIG. 2, two motional modes (e.g., motional mode 1 (210*a*) and motional mode 2 (210*b*)) are shown in connection with a 'repump' laser beam operation 210, although additional motional modes can also be cooled subsequent to cooling the first two motional modes. Also shown in FIG. 2 is the motion transfer operation 220 in which, as described in step (2) above, a motional dependent laser interaction transfers one quantum of motion into the state change from the lower internal energy state into the upper internal energy state. Each subsequent transfer is shown to take a longer time until the particular motional mode finally reaches its motional ground state and the next motional mode can be sideband cooled.

In contrast to the sequential (e.g., successive or serial) sideband cooling described above, this disclosure describes simultaneous or concurrent (e.g., parallel) mode cooling on multiple modes, which can greatly reduce the time needed to cool all the modes. For purposes of illustration, this concurrent or simultaneous process is being described using an example with four ions. This technique, however, can be applied to any number of ions trapped in a common trap well, or even in separate trap wells, or a combination of the two.

Figure 3:
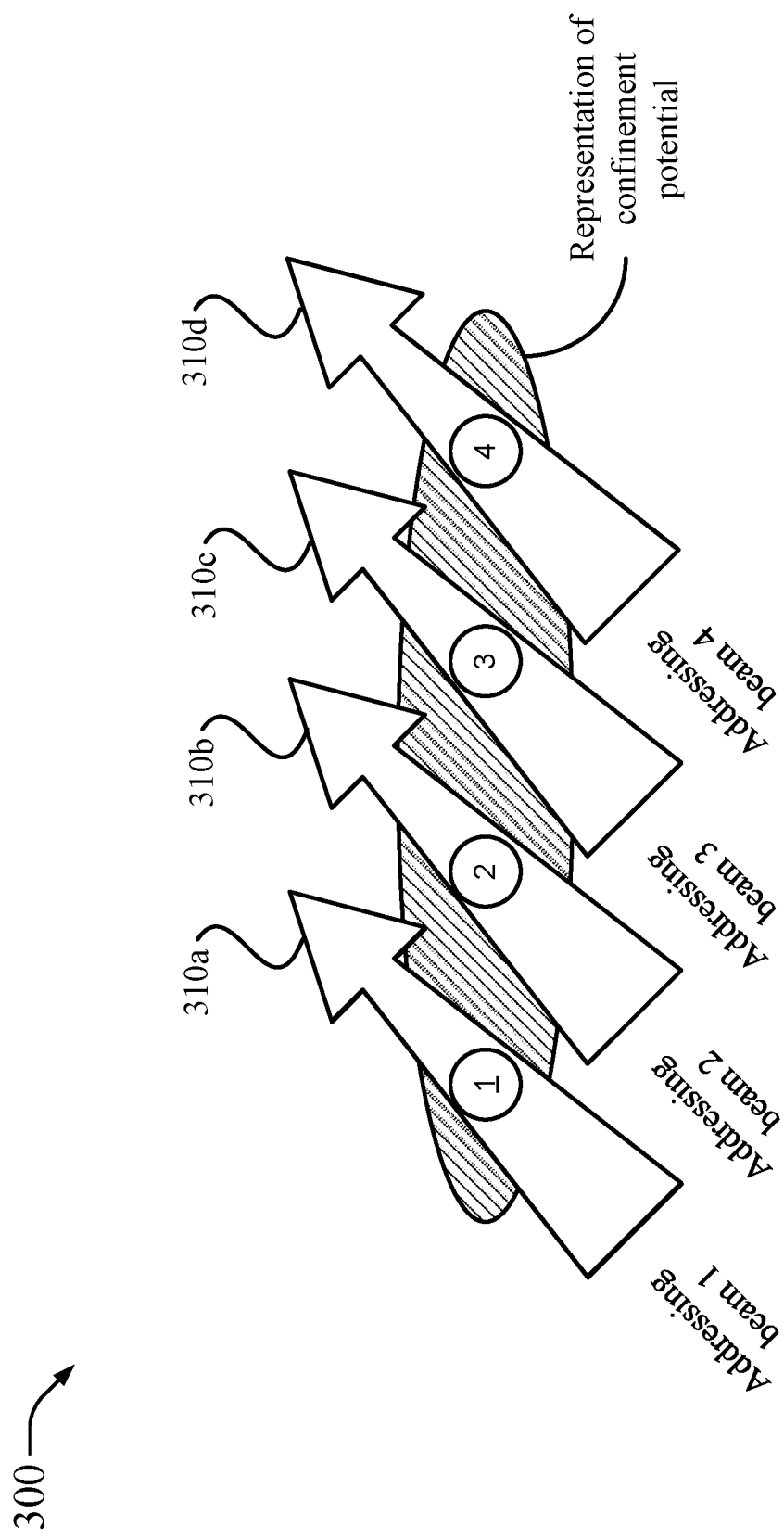
FIG. 3 is a diagram that illustrates an example of a chain with four (4) ions confined in a potential in accordance with aspects of this disclosure.

FIG. 3 shows a diagram 300 in which the four ions are fully confined in a potential (within a Paul trap, for example). For N ions, there are 3×N combined modes of motion, usually forming 3 separate groups of N modes. In this example, one of the groups of N modes is used; however, the method can address any N modes that couple to the sideband cooling laser beams (e.g., addressing beams 310*a*, 310*b*, 310*c*, and 310*d*). For a chain of two or more ions, then N≥2.

Figure 4:
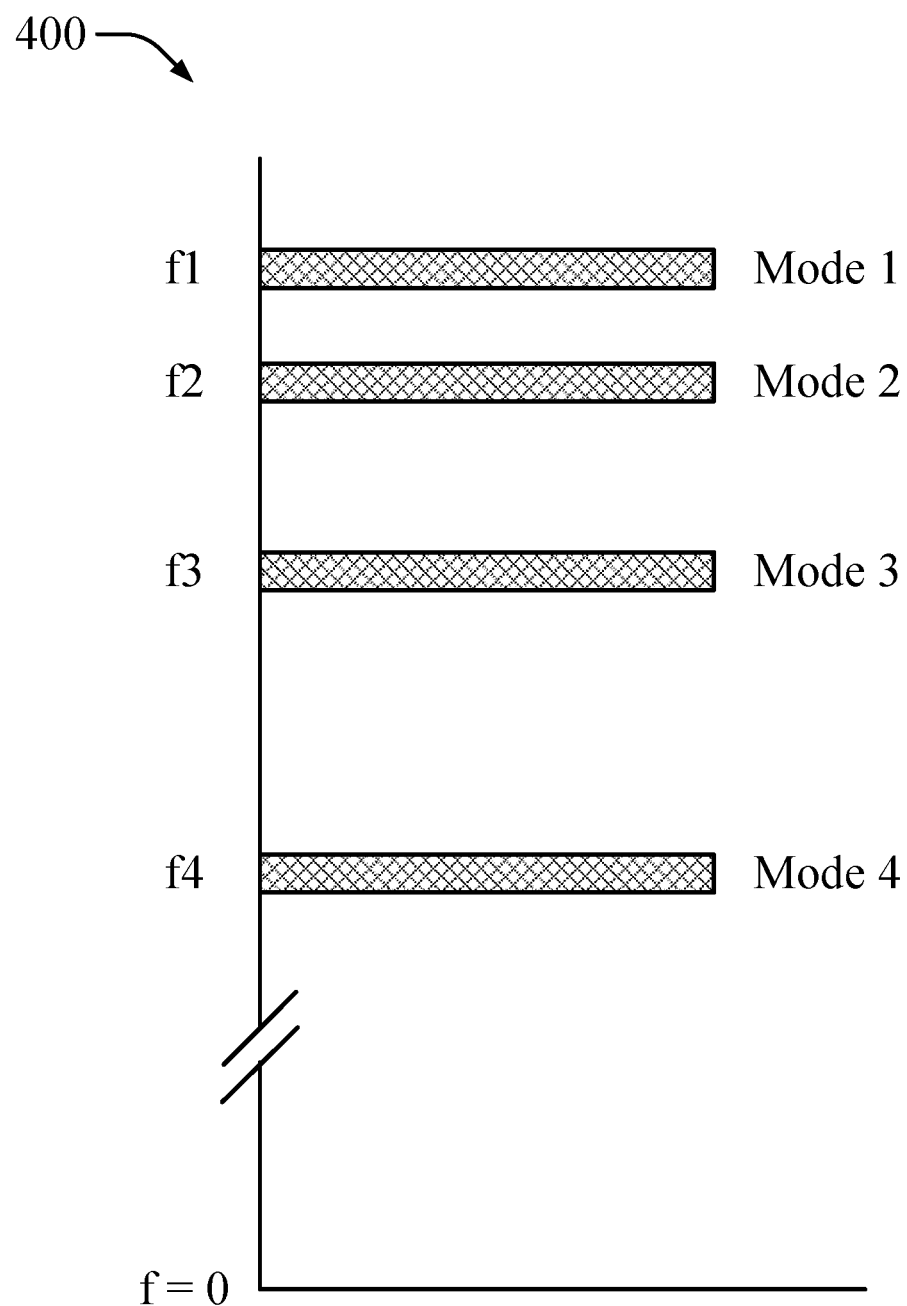
FIG. 4 is a diagram that illustrates an example of a distribution of a set of N=4 motional modes in accordance with aspects of this disclosure.

FIG. 4 shows a diagram 400 with an example of a distribution of a set of N motional modes frequencies for N=4 modes. The motional modes can include one or more longitudinal or axial modes with respect to the ion chain, one or more transverse or radial modes with respect to the ion chain, or a combination thereof.

Figure 5A:
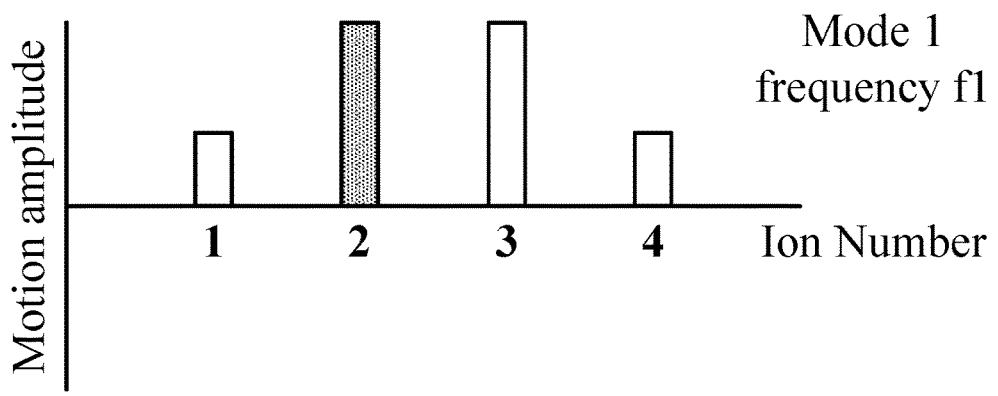
FIGS. 5A and 5B are diagrams that illustrate examples of a set of ion motion amplitudes for the modes in FIG. 4 in accordance with aspects of this disclosure.
Figure 5A:
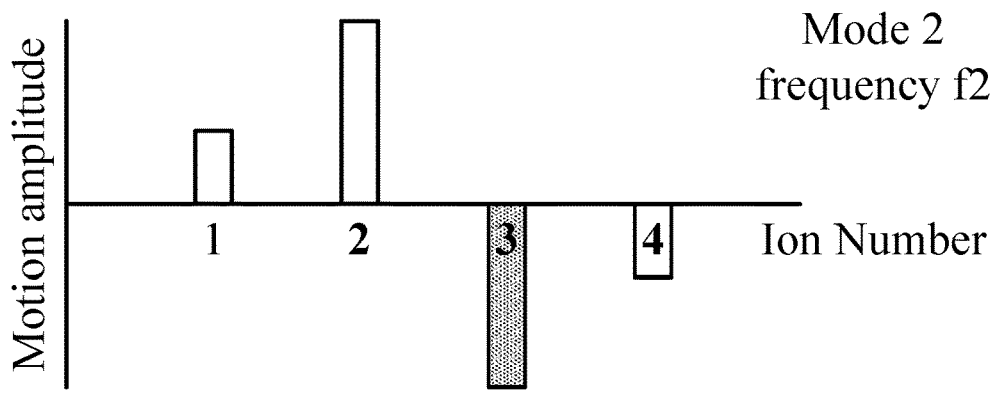
Figure 5B:
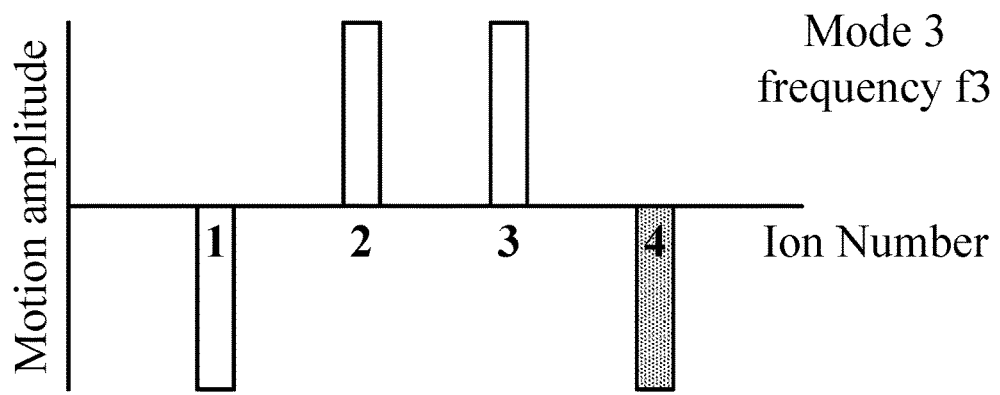
Figure 5B:
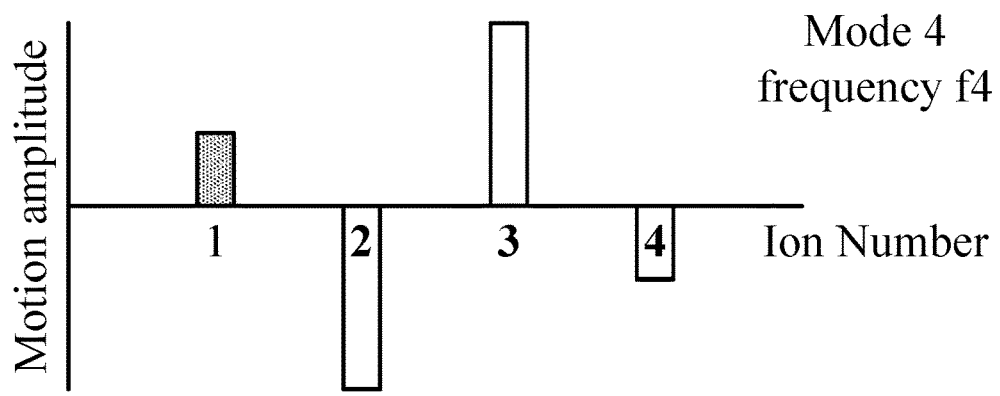

FIGS. 5A and 5B show diagrams 500, 510, 520, and 530 describing an example set of ion motion amplitudes for each of the N=4 modes. In the diagram 500, a motional mode 1 (mode 1) from FIG. 4 associated with frequency f1 is addressed by a second ion (ion 2—shaded) in the four-ion chain. In the diagram 510, a motional mode 2 (mode 2) from FIG. 4 associated with frequency f2 is addressed by the third ion (ion 3—shaded) in the four-ion chain. In the diagram 520, a motional mode 3 (mode 3) from FIG. 4 associated with frequency f3 is addressed by the fourth ion (ion 4—shaded) in the four-ion chain. In the diagram 530, a motional mode 4 (mode 4) from FIG. 4 and associated with frequency f4 is addressed by the first ion (ion 1—shaded) in the four-ion chain.

As shown in FIG. 3, each ion is separately addressed by a sideband cooling laser (or combination of lasers). Each addressing beam (e.g., addressing beams 1 (310*a*), 2 (310*b*), 3 (310*c*), and 4 (310*d*)) is tuned to interact with a different motional mode from FIG. 4. For optimal cooling, the ion addressed by each beam should have a large amplitude in the motional mode, see FIGS. 5A and 5B, to which that beam is tuned.

Because each beam is both localized to a particular ion in the chain and to a particular mode, the process of transferring a quantum of motion to the ion's internal state step (2) given above is largely independent for each beam and can occur simultaneously or concurrently. The resets of steps (1) and (3) are the same and common among all the ions. The sequential addressing of motional states from FIG. 2 is replaced now by a parallel cooling of these states as shown in the diagram 600 in FIG. 6. This parallelization results in an N-fold decrease in the time needed to cool the chain of ions.

In addition to the general technique for simultaneous or concurrent sideband cooling described above, other aspects can also be implemented based on the ability to individually address ions with separate laser beams. For example, in a first aspect, the ions in the chain can be of two or more species or isotopes (e.g., one type of ion is $^{171}Yb^+$ and another type of ion is different from $^{171}Yb^+$ and used for sympathetic cooling). This allows for sympathetic cooling during the quantum operations (as opposed to waiting until the sideband cooling is completed before performing the quantum operations). In another aspect, a single motional mode may be addressed by two or more ions and two or more laser beams. The cooling pulses in this case may be applied sequentially, transferring more than one quanta into the multiple ions prior to applying the repump. In yet another aspect, the repump beam may be individually addressed such that the sideband cooling on each ion can be run asynchronous without having to align the repump pulses across all ions.

Additional details and context related to the techniques for simultaneous or concurrent sideband cooling of multiple motional modes by individually addressing the ions in a chain are described below.

Cooling of the ions in a chain (e.g., ion crystal or ion lattice) to a ground state of motion (motional ground state) is one of the starting steps for any quantum operation or computation. This is generally done through various laser interactions. One of the challenges is that the number of degrees of freedom that need to be consider to cool the ions increases as the number of ions (e.g., the number of qubits) increases. As such, as the number of ions increases so does the time it takes to cool the ions down, which can result in the unfavorable condition that more time is spent cooling the ions than performing quantum operations or computations. Moreover, the ion trap (e.g., Paul trap) may end up heating the ions, which counters the cooling performed on the ions.

Because the quantum information processing (QIP) systems described herein are capable of individually addressing each ion in a chain, it is possible to use these capabilities to parallelize the cooling of all of the motional modes in a set (or at least a third of all the possible motional modes). As such, it is then possible to have each ion address a different motional mode simultaneously or concurrently since they are, to a large extent, independent. Therefore, the repeated process of removing quanta can be performed on all N modes at the same time until the motional ground state is reached for all of the motional modes.

Motional modes may refer to normal modes of motion. For example, the ions in a chain may behave like weights on a chain of springs (e.g., couple oscillators) and their motion can be represented by a set of oscillating frequencies. Accordingly, the motional modes may correspond to the different frequencies of oscillation. The normal modes of motion may represent decoupled degrees of freedom and it may be possible to excite one without necessarily exciting the others. Because of this decoupling, it is possible for one normal mode to be hot (e.g., excited) and another normal mode to be cold (e.g., not excited). It may therefore be necessary, in order to prepare the chain of ions for quantum operations or computations, to cool the separate or decoupled normal modes of motion (e.g., motional modes).

Previous techniques for sideband cooling the ions relied on sequential cooling as described above. That is, a first of the motional modes is cooled, then a second one, then a third one, until all the motional modes are cooled. There are a couple of issues with these techniques. The first is that it takes a long time for this process to complete, and the second is that the earlier modes begin to heat up before the process is completed. Therefore, this sequential approach is not scalable, particularly as the number of ions needed for quantum computations and operations increases.

The problems associated with the sequential cooling described above can be overcome by the individual addressing of ions supported by the QIP systems described herein. The individual addressing of ions also allows for various optimization techniques. For example, in a case of N=3 (three motional modes or normal modes of motion), it may be possible to control the motion of each of the ions with a separate laser beam for each ion. So this is a case of 3 ions and 3 normal modes. One of the modes may be such that the central or middle ion does not move or participate in the motion at all. In such a case, shining a laser beam on the central or middle ion is inefficient because the middle ion is not coupled. Based on this example, it is clear that certain ions coupled more effectively to certain motional modes (e.g., the end ions in this example), and certain ions are disengaged (e.g., the central or middle ion). Accordingly, it is possible to identify which ion (or ions) is best suited to cool a particular motional mode, and then shine or provide a laser beam to that specific ion at the frequency associated with the respective motional mode to cool that motional mode through that ion. As described above, the diagram 400 in FIG. 4 shows an example of correspondence of different frequencies to different modes for N=4, while the diagrams 500, 510, 520, and 530 in FIGS. 5A and 5B show examples of how different ions can be used for different modes/frequencies.

As described above, the cooling is incremental and requires the removal of one quanta of energy from each of the motional modes at each step in a sequence of repeated steps (see e.g., steps (1), (2), (3), and (4) above). In general, an information qubit in the chain is set or reset to ground, then a transfer is made using a laser beam (e.g., a gate laser). All the ions are hit simultaneously or concurrently by their respective gate lasers, where each of these lasers is tuned to a particular frequency to address a specific mode (see e.g., FIGS. 3 and 4). Each laser pulls one quanta into an internal information state, which is then erased such that the information gets lost or destroyed but results in one quanta being removed from the motion. This process of having the gate beams or gate lasers interact with the ions to pull the motional information into an internal state and then erase is repeated multiple times. In some examples, more than one laser can be tuned to the same frequency to address the same mode in order to remove multiple quanta of motion from that mode at once.

An additional optimization that can be performed during simultaneous or concurrent sideband cooling is that the amount of time a gate laser or beam interacts with its respective ion may be different than the amount of time another gate laser or beam interacts with its own respective ion. That is, interactions with different ions to address different motional modes may take different amounts of time.

Another optimization that may be performed includes erasing (e.g., removing the quanta of motion) at different times for different motional modes or ions.

Other aspects that may need optimization include when the frequencies of certain motional modes are very close and individually addressing the motional modes may be challenging if the respective beams for these modes are close to each other. One approach may be to select the ions for each closely spaced mode using the criteria that that ion has strong coupling only to that mode and not to the other modes. The variation in coupling strengths is illustrated by the motion amplitudes in the diagrams in FIGS. 5A and 5B.

Also as described above, there are typically two different stages of cooling. First, there is Doppler cooling, and second, there is sideband cooling. Doppler cooling can typically get the amount of motion quanta to a few quanta but not all the way down to the motional ground state. Therefore, Doppler cooling ends up bringing the motional modes down to a few quanta, which is a reasonable for a first cooling stage. For the sideband cooling, the remaining quanta of motion are removed to bring the motional modes to the motional ground state. In general, the number of steps or repetitions can be determined such that the removal process is performed for a predetermined number of repetitions that ensures that there is no remaining quanta of motion in any of the motional modes.

Figure 6:
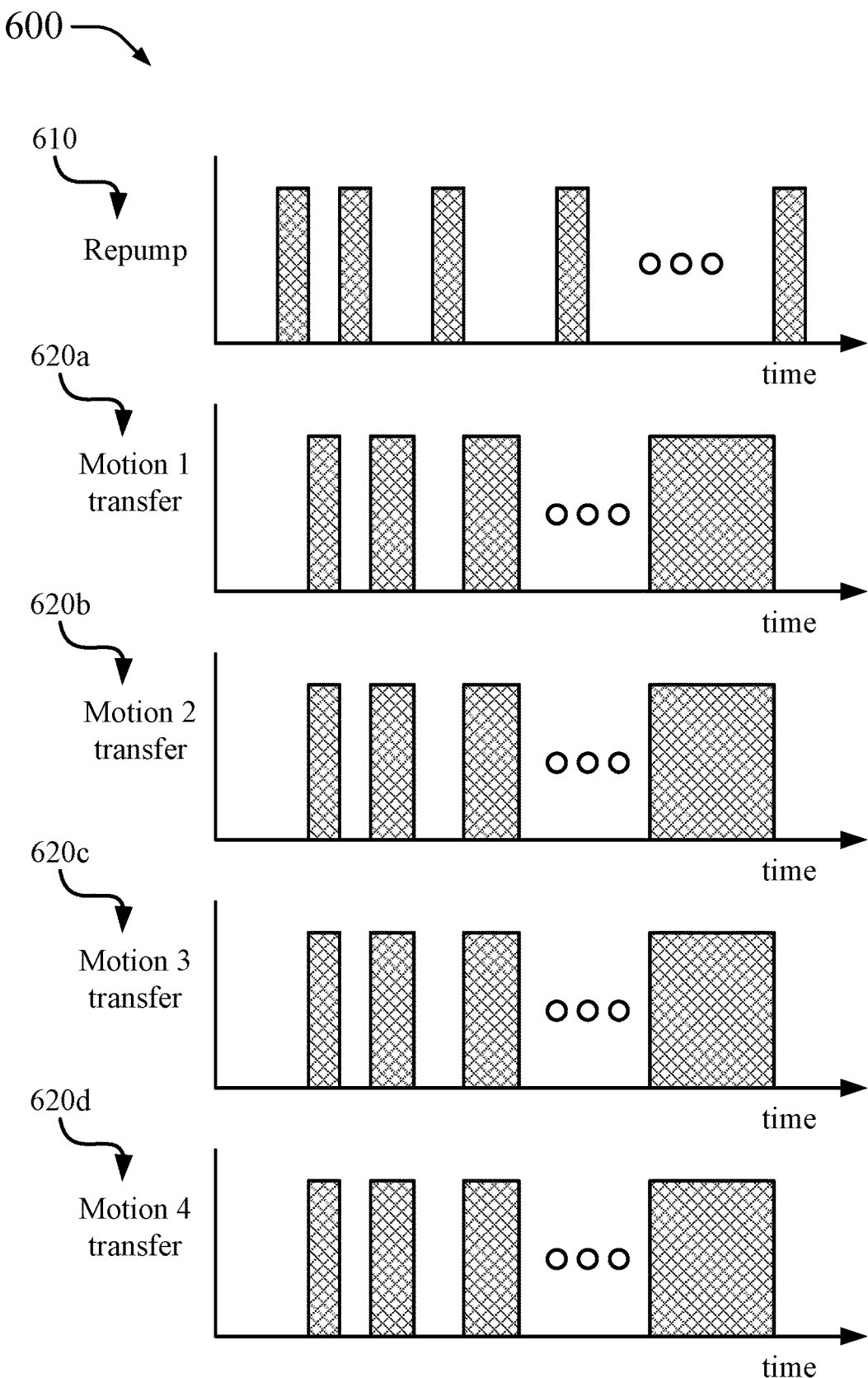
FIG. 6 is a diagram that illustrates an example of parallelization or concurrency of sideband cooling process in accordance with aspects of this disclosure.

As shown in FIGS. 2 and 6, as the number of quanta gets lower, it takes longer to remove the next quanta from a motional mode (e.g., the pulse width gets wider as it takes longer time). This is in part because of the time it takes for the transition within the qubit of absorbing one of the quanta and then resetting (e.g., the process of getting entropy out of the system/mode). Because of the increased amount of time it takes to remove every additional quanta of motion, it is necessary to control the amount of time dedicated to each step or repetition, as shown by the changing pulse width of the motional transfer laser beam in FIGS. 2 and 6.

Another aspect to consider and one described above, is that because of uncontrolled electric field fluctuations in the trap electrodes, and because the ions are charged particles, the ions are going to be heated by the electrodes in the ion trap. This effect is referred to as the heating rate. Accordingly, one of the benefits of simultaneous or concurrent sideband cooling is that it is efficient and fast enough that there is sufficient time to perform quantum computations or operations before the motional modes begin to heat up again (e.g., because of the heating rate). Overall it is desirable for the cooling rate to be faster than the heating rate.

One thing to point out is that not all motional modes may heat up at the same rate. For example, common modes (e.g., with motion in a same direction) may be easier to excite with slow fluctuating electric fields (or electric fields that tend to be uniform over the length scale of the spatial frequency of the mode), while differential modes (e.g., with motion in different directions) may need fast fluctuating electric fields (or electric fields with high spatial frequency compared to the spatial frequency of the mode) to be excited. Accordingly, another optimization opportunity associated with concurrent or simultaneous sideband cooling is that it is possible to spend more time and more resources (e.g., laser beams) to cool down the motional modes that heat up faster and spend less time and fewer resources to cool down the motional modes that are slow to heat up. For example, it is possible to allocate more ions and laser beams to cool those motional modes that heat up faster. In one example, if there is one remaining motional mode that needs to cool it is possible to allocate two or more ions and laser beams to more quickly remove any remaining quanta of motion from that motional mode.

An additional benefit of the QIP system described herein (see e.g., FIGS. 9A and 9B) and its application to concurrent or simultaneous sideband cooling is the ability, as described above, to perform sympathetic cooling while also performing quantum computations or operations. By using two different types of ions or isotopes, where there is at least one type (of atomic species or isotope) for computation and at least one type (of atomic species or isotope) for cooling (cooling or coolant ion) interspersed among the computational ions, it is possible to use the coolant ions to cool the nearby computational ions while the computation ions are being used to perform quantum computations or operations. One optimization opportunity is to place or position the coolant ions (sympathetic ions) where they would participate in motional modes to help cool those motional modes.

The various aspects described above for an efficient cooling process that includes a concurrent or simultaneous sideband cooling, along with the related examples described in connection with the four-ion chain in FIGS. 2-6, can be performed as methods or processes by different devices or systems. Additional details of such methods, processes, devices, or systems are further described below in connection with FIGS. 7-9B.

Figure 7:
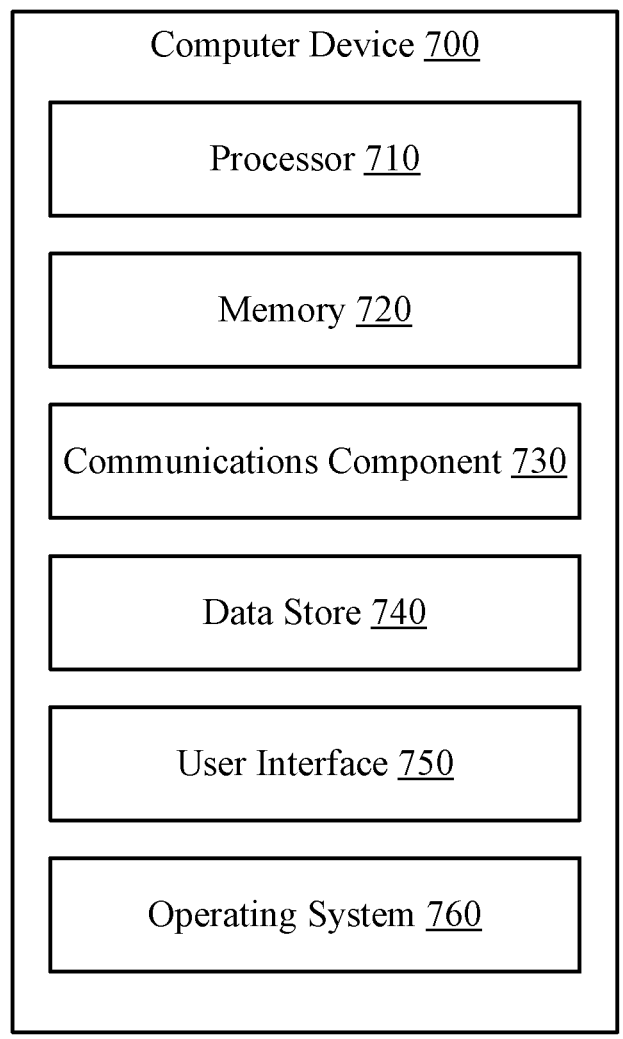
FIG. 7 is a diagram that illustrates an example of a computer device in accordance with aspects of this disclosure.

Referring now to FIG. 7, illustrated is an example computer device 700 in accordance with aspects of the disclosure. The computer device 700 can represent a single computing device, multiple computing devices, or a distributed computing system, for example. The computer device 700 may be configured as a quantum computer (e.g., a quantum information processing (QIP) system), a classical computer, or a combination of quantum and classical computing functions. For example, the computer device 700 may be used to process information using quantum algorithms based on trapped ion technology and may therefore implement methods or processes for efficient cooling, including techniques involved in concurrent or simultaneous sideband cooling of motional modes. A generic example of the computer device 700 as a QIP system that can implement the techniques described herein is illustrated in an example shown in FIGS. 9A and 9B.

In one example, the computer device 700 may include a processor 710 for carrying out processing functions associated with one or more of the features described herein. For example, the processor 710 may be configure to control, coordinate, and/or perform aspects of the concurrent or simultaneous sideband cooling of motional modes, as well as control, coordinate, and/or perform aspects of quantum computations or operations that take place while the cooling is being performed (e.g., sympathetic cooling). The processor 710 may include a single or multiple set of processors or multi-core processors. Moreover, the processor 710 may be implemented as an integrated processing system and/or a distributed processing system. The processor 710 may include a central processing unit (CPU), a quantum processing unit (QPU), a graphics processing unit (GPU0, or combination of those types of processors. In one aspect, the processor 710 may refer to a general processor of the computer device 700, which may also include additional processors 710 to perform more specific functions.

In an example, the computer device 700 may include a memory 720 for storing instructions executable by the processor 710 for carrying out the functions described herein. In an implementation, for example, the memory 720 may correspond to a computer-readable storage medium that stores code or instructions to perform one or more of the functions or operations described herein. In one example, the memory 720 may include instructions to perform aspects of a method 800 described below in connection with FIG. 8. Just like the processor 710, the memory 720 may refer to a general memory of the computer device 700, which may also include additional memories 720 to store instructions and/or data for more specific functions.

Further, the computer device 700 may include a communications component 730 that provides for establishing and maintaining communications with one or more parties utilizing hardware, software, and services as described herein. The communications component 730 may carry communications between components on the computer device 700, as well as between the computer device 700 and external devices, such as devices located across a communications network and/or devices serially or locally connected to computer device 700. For example, the communications component 730 may include one or more buses, and may further include transmit chain components and receive chain components associated with a transmitter and receiver, respectively, operable for interfacing with external devices.

Additionally, the computer device 700 may include a data store 740, which can be any suitable combination of hardware and/or software, that provides for mass storage of information, databases, and programs employed in connection with implementations described herein. For example, the data store 740 may be a data repository for operating system 760 (e.g., classical OS, or quantum OS). In one implementation, the data store 740 may include the memory 720.

The computer device 700 may also include a user interface component 750 operable to receive inputs from a user of the computer device 700 and further operable to generate outputs for presentation to the user or to provide to a different system (directly or indirectly). The user interface component 750 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 750 may include one or more output devices, including but not limited to a display, a speaker, a haptic feedback mechanism, a printer, any other mechanism capable of presenting an output to a user, or any combination thereof.

In an implementation, the user interface component 750 may transmit and/or receive messages corresponding to the operation of the operating system 760. In addition, the processor 710 may execute the operating system 760 and/or applications or programs, and the memory 720 or the data store 740 may store them.

When the computer device 700 is implemented as part of a cloud-based infrastructure solution, the user interface component 750 may be used to allow a user of the cloud-based infrastructure solution to remotely interact with the computer device 700.

Figure 8:
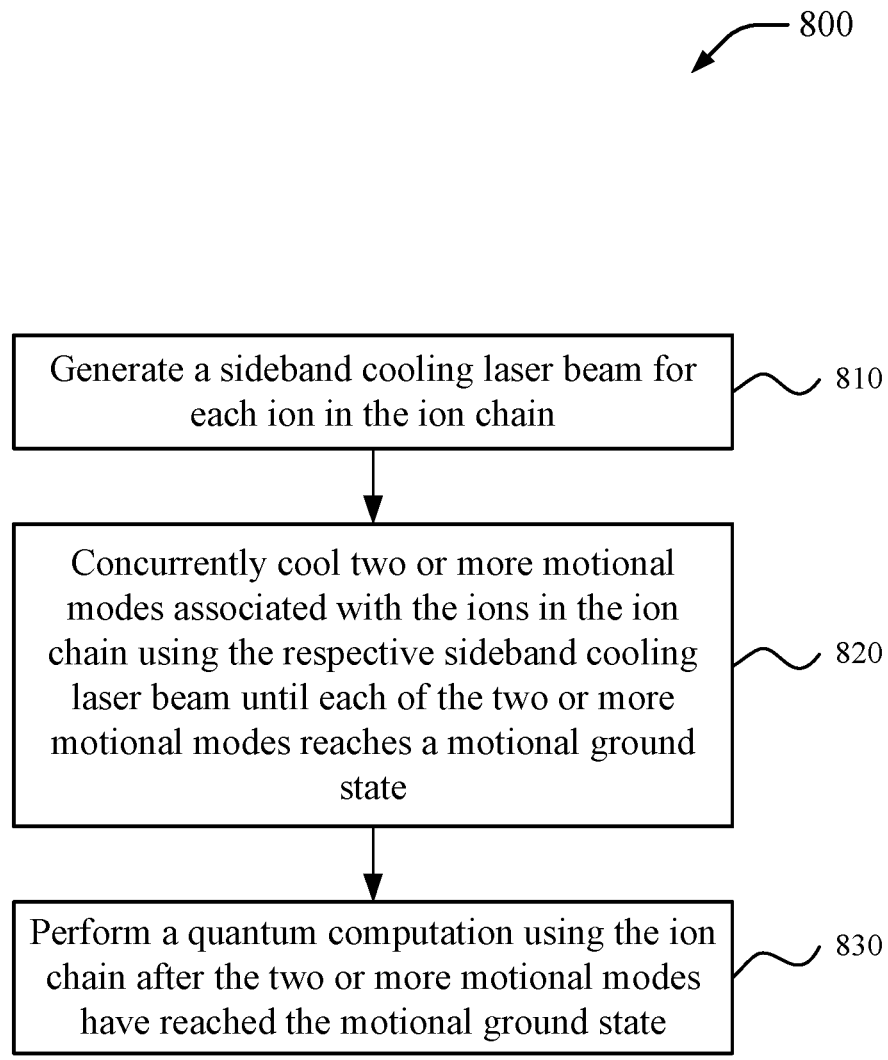
FIG. 8 is a flow diagram that illustrates an example of a method in accordance with aspects of this disclosure.

FIG. 8 is a flow diagram that illustrates an example of a method 800 for cooling of an ion chain having multiple ions in accordance with aspects of this disclosure. In an aspect, the method 800 may be performed in a computer system (e.g., as part of the operations of the computer system) such as the computer device 700 described above, where, for example, the processor 710, the memory 720, the data store 740, and/or the operating system 760 may be used to perform or control the functions of the method 800. Similarly, the functions of the method 800 may be performed or controlled by one or more components of a QIP system such as a QIP system 900 and its components (e.g., optical controller 920 and its subcomponents) described in more detail below in connection with FIGS. 9A and 9B.

At 810, the method 800 includes generating a sideband cooling laser beam for each ion in the ion chain.

At 820, the method 800 includes concurrently cooling two or more motional modes associated with the ions in the ion chain using the respective sideband cooling laser beam until each of the two or more motional modes reaches a motional ground state.

At 830, the method 800 includes performing a quantum computation using the ion chain after the two or more motional modes have reached the motional ground state.

In another aspect of the method 800, concurrently cooling two or more motional modes includes repeating the following sequence a number of times: resetting the ions into a lower energy state using a repump laser beam; performing a motional dependent laser interaction with the generated sideband cooling laser beams to transfer a quanta of motion from the lower energy state of the ions to a higher energy state of the ions; and resetting the ions again into the lower energy state. The number of times the sequence is repeated is a predetermined number of times that ensures that all of the two or more motional modes reach the motional ground state. The resetting the ions into a lower energy state using a repump laser beam can include resetting each of the ions into a lower energy state using a respective repump laser beam to enable asynchronous resetting of the ions.

In another aspect of the method 800, a number of the two or more motional modes is proportional to a number of ions in the ion chain.

In another aspect of the method 800, each of the two or more motional modes has a respective ion in the ion chain for sideband cooling using a corresponding sideband cooling laser beam.

In another aspect of the method 800, the two or more motional modes include longitudinal or axial modes with respect to the ion chain, transverse or radial modes with respect to the ion chain, or a combination thereof.

In another aspect of the method 800, the ions in the ion chain include ions of two or more species, with one of the species being used for sympathetic cooling, the concurrently cooling of the two or more motional modes associated with the ions in the ion chain is performed using the ions of the species used for sympathetic cooling, and the quantum computation is performed with one or more of the remaining species while the concurrent cooling is taking place.

In yet another aspect of the method 800, at least one of the two or more motional modes is sideband cooled using two or more ions and two or more of the sideband cooling laser beams.

Figure 9A:
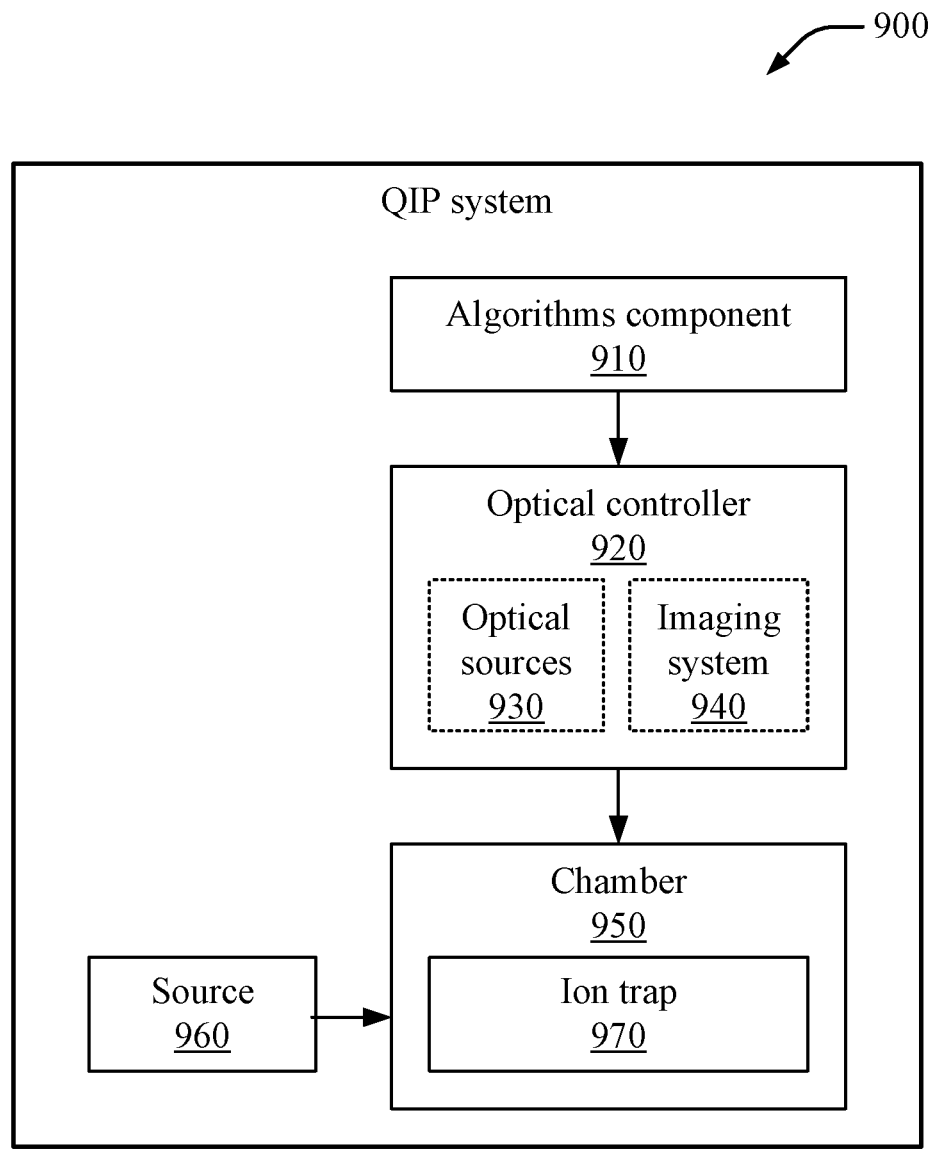
FIG. 9A is a block diagram that illustrates an example of a quantum information processing (QIP) system in accordance with aspects of this disclosure.

FIG. 9A is a block diagram that illustrates the QIP system 900 in accordance with aspects of this disclosure. The QIP system 900 may also be referred to as a quantum computing system, a computer device, a trapped-ion quantum computer, or the like. In an aspect, the QIP system 900 may correspond to portions of a quantum computer implementation of the computer device 700 in FIG. 7.

Figure 9B:
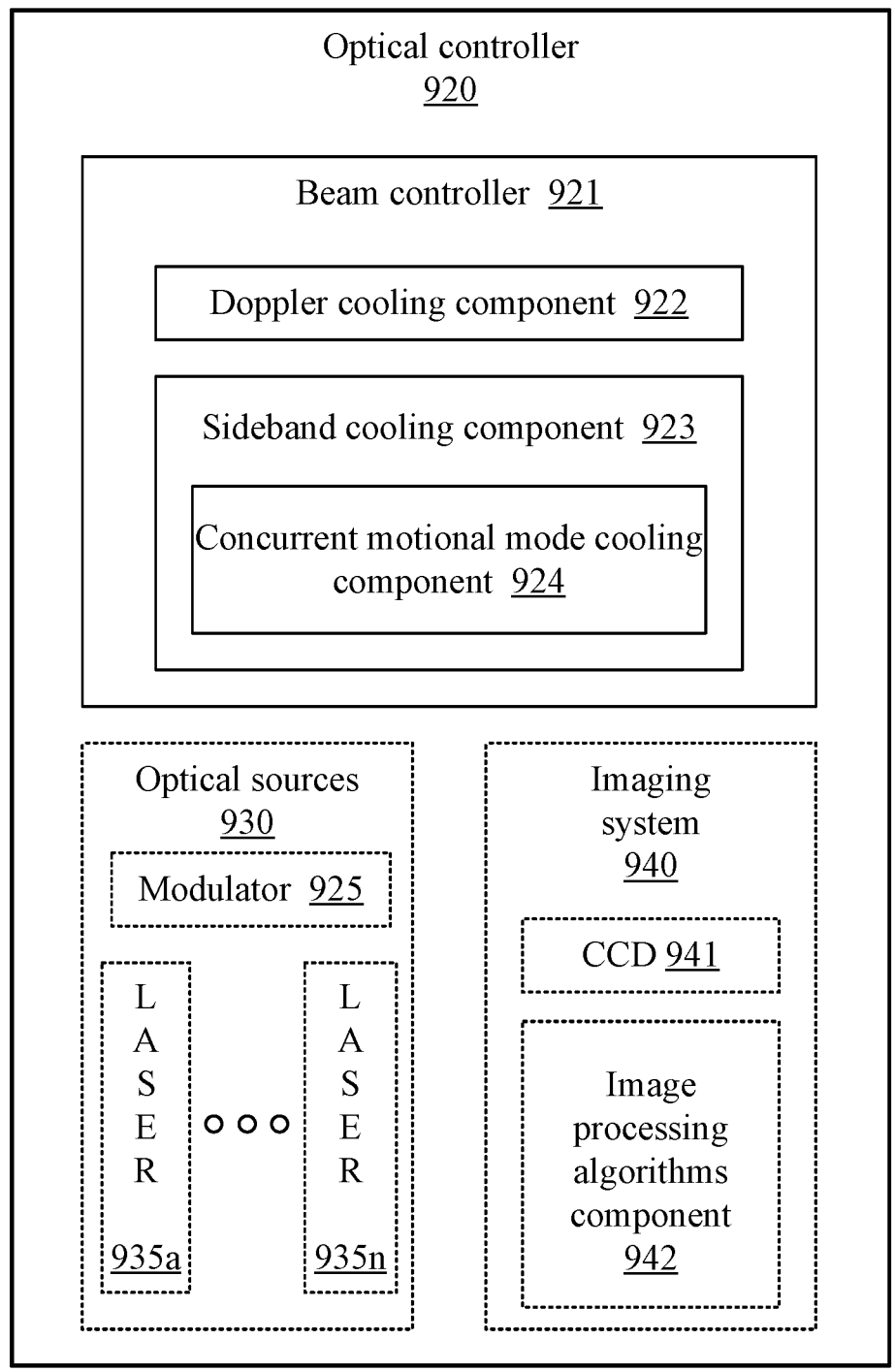
FIG. 9B is a block diagram that illustrates an example of an optical controller used in connection with parallelized sideband cooling in accordance with aspects of this disclosure.

The QIP system 900 can include a source 960 that provides atomic species (e.g., a flux of neutral atoms) to a chamber 950 having an ion trap 970 that traps the atomic species once ionized (e.g., photoionized) by an optical controller 920 (see e.g., FIG. 9B). Optical sources 930 (e.g., lasers that produce beams) in the optical controller 920 may include one or more laser sources that can be used for ionization of the atomic species, control (e.g., phase control) of the atomic ions, for fluorescence of the atomic ions that can be monitored and tracked by image processing algorithms operating in an imaging system 940 in the optical controller 920, and/or to perform the optical cooling functions described in this disclosure, including Doppler cooling and concurrent or simultaneous sideband cooling of motional modes. In an aspect, the optical sources 930 may be implemented separately from the optical controller 920.

The imaging system 940 can include a high resolution imager (e.g., CCD camera) for monitoring the atomic ions while they are being provided to the ion trap or after they have been provided to the ion trap 970. In an aspect, the imaging system 940 can be implemented separate from the optical controller 920, however, the use of fluorescence to detect, identify, and label atomic ions using image processing algorithms may need to be coordinated with the optical controller 920.

The QIP system 900 may also include an algorithms component 910 that may operate with other parts of the QIP system 900 (not shown) to perform quantum algorithms or quantum operations, including single qubit operations or multi-qubit operations as well as extended quantum computations. As such, the algorithms component 910 may provide instructions to various components of the QIP system 900 (e.g., to the optical controller 920) to enable the implementation of the quantum algorithms or quantum operations. In an example, the algorithms component 910 may perform, coordinate, and/or instruct the performance of quantum computations or operations after sideband cooling is complete or during sideband cooling if sympathetic cooling techniques are being applied, as described above in connection with concurrent or simultaneous sideband cooling.

FIG. 9B shows at least a portion of the optical controller 920. In this example, the optical controller 920 can include a beam controller 921, the optical sources 930, and the imaging system 940. As shown by the dotted lines, one or both of the optical sources 930 and the imaging system 940 may be implemented separate from, but in communication with, the optical controller 920. The imaging system 940 includes a CCD 941 (or similar imager or camera) and an image processing algorithms component 942. The optical sources 930 includes a modulator 925 and multiple laser sources 935a, . . . , 935b, which may be used for one or more of the functions described above (e.g., to produce laser or gate beams for cooling operations).

The beam controller 921 is configured to perform various aspects described herein for coherently controlling quantum phases on atomic qubits mediated by control fields, as applied to quantum logic gates, and/or in connection with generalized interactions between qubits. The beam controller 921 may include a Doppler cooling component 922 configured to use laser beams to perform a first stage of cooling of the motional modes of an ion chain (e.g., ions in a crystal or lattice in the ion trap 970). The beam controller 921 may also include a sideband cooling component 923 having a concurrent motional mode cooling component 924 to perform the various aspects described herein for a second stage of cooling of the motional modes of an ion chain, where the second stage of cooling involves concurrent or simultaneous (e.g., non-sequential) cooling of the motional modes. In one implementation, the Doppler cooling component 922 and the sideband cooling component 923 may be part of the same component and/or may be implemented separate from the beam controller 921 but in communication with the beam controller 921.

The various components of the optical controller 920 may operate individually or in combination to perform the various functions described in this disclosure, for example, the method 800 in FIG. 8. Moreover, the various components of the optical controller 920 may operate with one or more of the components of the QIP system 900 to perform the various functions described in this disclosure, for example, the method 800 in FIG. 8.

Although the present disclosure has been provided in accordance with the implementations shown, one of ordinary skill in the art will readily recognize that there could be variations to the embodiments and those variations would be within the scope of the present disclosure. Accordingly, various modifications may be made by one of ordinary skill in the art without departing from the scope of the appended claims.

What is claimed is:

1. A method for cooling of an ion chain having multiple ions, comprising:
   generating repump beams configured to concurrently reset two or more of the multiple ions in the ion chain;
   generating a sideband cooling laser beam for each of the two or more ions in the ion chain, with each sideband cooling laser beam having a different frequency to cool a different motional mode using the respective ion;
   concurrently cooling two or more motional modes associated with the two or more ions in the ion chain using the respective sideband cooling laser beam and the respective ion until each of the two or more motional modes reaches a motional ground state; and
   performing a quantum computation using the ion chain after the two or more motional modes have reached the motional ground state.

2. The method of claim 1, wherein concurrently cooling two or more motional modes includes repeating the following sequence a number of times:
   concurrently resetting, based on the generated repump beams, the two or more ions into a lower energy state using a repump laser beam;
   performing a motional dependent laser interaction with the generated sideband cooling laser beams to transfer a quanta of motion from the lower energy state of the two or more ions to a higher energy state of the two or more ions; and
   concurrently resetting, based on the generated repump beams, the two or more ions again into the lower energy state.

3. The method of claim 2, wherein the number of times the sequence is repeated is a predetermined number of times that ensures that all of the two or more motional modes reach the motional ground state.

4. The method of claim 1, wherein a number of the two or more motional modes is proportional to a number of the multiple ions in the ion chain.

5. The method of claim 1, wherein the two or more motional modes include longitudinal or axial modes with respect to the ion chain, transverse or radial modes with respect to the ion chain, or a combination thereof.

6. The method of claim 1, wherein:
   the two or more ions in the ion chain include ions of two or more species, with ions of one species of the two or more species being used for sympathetic cooling,
   the concurrently cooling of the two or more motional modes associated with the two or more ions in the ion chain is performed using the ions of the one species used for sympathetic cooling, and
   the quantum computation is performed with the ions of one or more species of the remaining two or more species while the concurrent cooling is taking place.

7. A quantum information processing (QIP) system for cooling of an ion chain having multiple ions, comprising:
   one or more optical sources configured to:
      generate repump beams configured to concurrently reset two or more of the multiple ions in the ion chain;
      generate a sideband cooling laser beam for each of the two or more ions in the ion chain, with each sideband cooling laser beam having a different frequency to cool a different motional mode using the respective ion;
   a beam controller configured to concurrently cool two or more motional modes associated with the two or more ions in the ion chain using the respective sideband cooling laser beam and the respective ion until each of the two or more motional modes reaches a motional ground state; and
   an algorithms component configured to perform a quantum computation using the ion chain after the two or more motional modes have reached the motional ground state.

8. The QIP system of claim 7, wherein the beam controller configured to concurrently cool two or more motional modes is further configured to repeat the following sequence a number of times:
   concurrently reset, based on the generated repump beams, the two or more ions into a lower energy state using a repump laser beam;
   perform a motional dependent laser interaction with the generated sideband cooling laser beams to transfer a quanta of motion from the lower energy state of the two or more ions to a higher energy state of the two or more ions; and
   concurrently reset, based on the generated repump beams, the two or more ions again into the lower energy state.

9. The QIP system of claim 8, wherein the number of times the sequence is repeated is a predetermined number of times that ensures that all of the two or more motional modes reach the motional ground state.

10. The QIP system of claim 7, wherein a number of the two or more motional modes is proportional to a number of the multiple ions in the ion chain.

11. The QIP system of claim 7, wherein the two or more motional modes include longitudinal or axial modes with respect to the ion chain, transverse or radial modes with respect to the ion chain, or a combination thereof.

12. The QIP system of claim 7, wherein:
   the two or more ions in the ion chain include ions of two or more species, with the ions of one species of the two or more species being used for sympathetic cooling,
   the beam controller is configured to concurrently cool the two or more motional modes associated with the two or more ions in the ion chain by using the ions of the one species used for sympathetic cooling, and the algorithms component is configured to perform the quantum computation with the ions of one or more species of the remaining two or more species while the concurrent cooling is taking place.

13. A quantum information processing (QIP) apparatus for cooling of an ion chain having multiple ions, comprising:

means for generating repump beams configured to concurrently reset two or more of the ions in the ion chain;

means for generating a sideband cooling laser beam for each of the two or more ions in the ion chain, each sideband cooling laser beam having a different frequency to cool a different motional mode using the respective ion;

means for concurrently cooling two or more motional modes associated with the two or more ions in the ion chain using the respective sideband cooling laser beam and the respective ion until each of the two or more motional modes reaches a motional ground state; and means for performing a quantum computation using the ion chain after the two or more motional modes have reached the motional ground state.

14. The QIP apparatus of claim 13, wherein:

the two or more ions in the ion chain include ions of two or more species, with the ions of one species of the two or more species being used for sympathetic cooling, the concurrently cooling of the two or more motional modes associated with the ions in the ion chain is performed using the two or more ions of the one species used for sympathetic cooling, and the quantum computation is performed with the ions of one or more species of the remaining two or more species while the concurrent cooling is taking place.

15. A non-transitory computer-readable storage medium storing code with instructions executable by a processor for cooling of an ion chain having multiple ions, comprising:

code for generating repump beams configured to concurrently reset two or more of the ions in the ion chain; code for generating a sideband cooling laser beam for each of the two or more ions in the ion chain, each sideband cooling laser beam having a different frequency to cool a different motional mode using the respective ion; code for concurrently cooling two or more motional modes associated with the two or more ions in the ion chain using the respective sideband cooling laser beam and the respective ion until each of the two or more motional modes reaches a motional ground state; and code for performing a quantum computation using the ion chain after the two or more motional modes have reached the motional ground state.

16. The non-transitory computer-readable storage medium of claim 15, wherein:

the two or more ions in the ion chain include ions of two or more species, with the ions of one species of the two or more species being used for sympathetic cooling, the concurrently cooling of the two or more motional modes associated with the ions in the ion chain is performed using the two or more ions of the one species used for sympathetic cooling, and the quantum computation is performed with the ions of one or more species of the remaining two or more species while the concurrent cooling is taking place.

* * * * *